US012263540B2

(12) United States Patent
Wang et al.

(10) Patent No.: US 12,263,540 B2
(45) Date of Patent: *Apr. 1, 2025

(54) LASER PROCESSING DEVICE AND LASER PROCESSING METHOD USING SAME

(71) Applicant: Panasonic Intellectual Property Management Co., Ltd., Osaka (JP)

(72) Inventors: Jingbo Wang, Hyogo (JP); Masatoshi Nishio, Osaka (JP); Kenzo Shibata, Hyogo (JP); Manabu Nishihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 741 days.

This patent is subject to a terminal disclaimer.

(21) Appl. No.: 17/527,453

(22) Filed: Nov. 16, 2021

(65) Prior Publication Data

US 2022/0072661 A1 Mar. 10, 2022

Related U.S. Application Data

(63) Continuation of application No. PCT/JP2020/017618, filed on Apr. 24, 2020.

(30) Foreign Application Priority Data

May 29, 2019 (JP) .................. 2019-100181

(51) Int. Cl.
*B23K 26/384* (2014.01)
*B23K 26/035* (2014.01)
(Continued)

(52) U.S. Cl.
CPC .......... *B23K 26/384* (2015.10); *B23K 26/035* (2015.10); *B23K 26/062* (2015.10); *B23K 26/064* (2015.10)

(58) Field of Classification Search
CPC .. B23K 26/035; B23K 26/064; B23K 26/082; B23K 26/062; B23K 26/384;
(Continued)

(56) References Cited

U.S. PATENT DOCUMENTS 5,245,682 A * 9/1993 Ortiz, Jr. .............. G02B 6/4206
385/38
8,781,269 B2 * 7/2014 Huber .................... G02B 6/262
385/18
(Continued)

FOREIGN PATENT DOCUMENTS

JP 59-042502 3/1984
JP 61-016938 Y 5/1986
(Continued)

OTHER PUBLICATIONS

Extended European Search Report issued Jun. 4, 2024 in European Patent Application No. 20 815 665.3.
(Continued)

*Primary Examiner* — Eric S Stapleton
(74) *Attorney, Agent, or Firm* — Wenderoth, Lind & Ponack, L.L.P.

(57) ABSTRACT

A laser processing device includes a laser oscillator, an optical fiber that is a multi-clad fiber, a beam control mechanism provided in the laser oscillator, and a laser light emitting head attached to the optical fiber. The beam control mechanism includes a condenser lens, an optical path changing and holding mechanism that is disposed between the condenser lens and an incident end face of the optical fiber and changes an optical path of laser light LB, and a controller that controls an operation of the optical path changing and holding mechanism. The beam control mecha-
(Continued)

nism controls a power distribution of the laser light by changing an incident position of the laser light on the incident end face.

11 Claims, 12 Drawing Sheets

(51) Int. Cl.
*B23K 26/062* (2014.01)
*B23K 26/064* (2014.01)

(58) Field of Classification Search
CPC ............... B23K 26/21; B23K 26/0626; G02B 26/0875; G02B 27/095; G02B 27/0927; G02B 6/3528; G02B 6/4206; H01S 3/0071
USPC .................................................... 219/121.67
See application file for complete search history.

(56) References Cited

U.S. PATENT DOCUMENTS

| | | | | |
|---|---|---|---|---|
| 9,470,842 | B2* | 10/2016 | Mori | G02B 6/4296 |
| 10,088,632 | B2* | 10/2018 | Zhou | G02B 6/32 |
| 2002/0064353 | A1* | 5/2002 | Yokoyama | G02B 6/4215 |
| | | | | 385/88 |
| 2003/0000927 | A1* | 1/2003 | Kanaya | B23K 26/389 |
| | | | | 219/121.62 |
| 2004/0026381 | A1* | 2/2004 | Tsukamoto | B23K 26/24 |
| | | | | 219/121.6 |
| 2011/0290769 | A1* | 12/2011 | Furuta | B23K 26/40 |
| | | | | 219/121.72 |
| 2015/0049987 | A1* | 2/2015 | Grasso | G02B 6/4204 |
| | | | | 385/33 |
| 2015/0293306 | A1* | 10/2015 | Huber | B23K 26/067 |
| | | | | 385/18 |
| 2018/0009060 | A1* | 1/2018 | Yang | B23K 26/0626 |
| 2018/0147660 | A1* | 5/2018 | Scherbakov | B23K 26/067 |
| 2018/0159299 | A1* | 6/2018 | Zhou | G02B 6/04 |
| 2019/0278026 | A1* | 9/2019 | Nishio | G02B 6/4296 |
| 2022/0072655 | A1* | 3/2022 | Wang | B23K 26/0884 |
| 2022/0072661 | A1* | 3/2022 | Wang | B23K 26/035 |
| 2022/0072662 | A1* | 3/2022 | Wang | B23K 26/064 |

FOREIGN PATENT DOCUMENTS

| | | |
|---|---|---|
| JP | 7-301724 | 11/1995 |
| JP | 10-314973 | 12/1998 |
| JP | 2002-224867 | 8/2002 |
| JP | 2003-001464 | 1/2003 |
| JP | 2011-253866 | 12/2011 |
| WO | 2010/119173 | 10/2010 |
| WO | 2018/110016 | 6/2018 |

OTHER PUBLICATIONS

International Search Report of PCT application No. PCT/JP2020/017618 dated Jun. 9, 2020.
Extended European Search Report dated Jul. 6, 2022 in corresponding European Patent Application No. 20815665.3.

* cited by examiner

LASER PROCESSING DEVICE AND LASER PROCESSING METHOD USING SAME

This application is a continuation of the PCT International Application No. PCT/JP2020/017618 filed on Apr. 24, 2020, which claim the benefit of foreign priority of Japanese patent application No. 2019-100181 filed on May 29, 2019, the contents all of which are incorporated herein by reference.

TECHNICAL FIELD

The present invention relates to a laser processing device and a laser processing method using the same.

BACKGROUND ART

In recent years, a technology of performing laser processing by changing a power distribution of laser light according to a material or a shape of a workpiece has been proposed.

For example, PTL 1 discloses a laser system in which laser light is incident on a plurality of bundled optical fibers that can be optically coupled with laser light. The laser system includes a reflector or a condenser lens disposed on an optical path of the laser light, and a piezo actuator that moves the reflector or the condenser lens. The piezo actuator causes the laser light to be incident on an optical fiber selected from among the plurality of optical fibers by changing an incident position of the laser light in the plurality of bundled optical fibers. Each optical fiber is a multi-clad fiber. The piezo actuator changes the power distribution of the laser light by adjusting the incident position of the laser light in the optical fiber.

PTL 2 proposes a configuration in which an incident position of laser light on an incident end face of a multi-clad fiber is changed by moving a position of a condenser lens or inserting a wedge-shaped optical element into an optical path of the laser light.

CITATION LIST

Patent Literature

PTL 1: US 2018/159299 A1
PTL 2: U.S. Pat. No. 8,781,269

SUMMARY OF THE INVENTION

Technical Problem

However, in the configuration disclosed in PTL 1, since the reflector and the condenser lens which are relatively large optical components are moved by the actuator, there is a problem in responsiveness, and it is difficult to quickly change the incident position on the optical fiber by changing the optical path of the laser light. Thus, when the shape of the workpiece changes, it is difficult to control the power distribution of the laser light according to the change, and it is difficult to maintain processing quality of the workpiece.

As disclosed in PTL 2, in the method for changing the incident position of the laser light by moving the position of the condenser lens, since it is necessary to linearly move the condenser lens by the actuator, there is a problem in achieving both positional accuracy and responsiveness. When the optical element is moved while being inserted into the optical path of the laser light during continuous oscillation, since the laser light is scattered in an unexpected direction by an edge portion of the optical element, there is a concern that a defect occurs in the laser processing. There is a concern that the inside of a laser resonator is damaged by the scattered laser light.

The present invention has been made in view of such a point, and an object of the present invention is to provide a laser processing device capable of changing a power distribution of laser light with a simple configuration and a laser processing method using the same.

Solution to Problem

In order to achieve the above object, a laser processing device according to the present invention includes at least a laser oscillator that generates laser light, an optical fiber that includes at least a core, a first cladding provided coaxially with the core on an outer peripheral side of the core, and a second cladding provided coaxially with the core on an outer peripheral side of the first cladding, and includes an incident end face and an emission end opposite to the incident end face, a beam control mechanism that is provided in the laser oscillator, and introduces the laser light into the incident end face of the optical fiber, and a laser light emitting head that is attached to the emission end of the optical fiber and illuminates the laser light to a workpiece. The beam control mechanism includes at least a condenser lens that receives the laser light and condenses the laser light at a predetermined magnification, an optical path changing and holding mechanism that is disposed on an optical path of the laser light between the condenser lens and the incident end face of the optical fiber, and changes and holds the optical path of the laser light, and a controller that controls an operation of the optical path changing and holding mechanism, and the beam control mechanism controls a power distribution of the laser light emitted from the laser light emitting head by changing an incident position of the laser light on the incident end face of the optical fiber.

According to this configuration, the incident position of the laser light on the incident end face of the optical fiber can be easily changed, and the power distribution of the laser light emitted from the laser light emitting head can be easily controlled.

A laser processing method according to the present invention is a laser processing method using the laser processing device. The method includes at least a first illumination step of illuminating the laser light having a first power distribution to the workpiece, and a second illumination step of subsequently illuminating the laser light having a second power distribution different from the first power distribution to the workpiece.

According to this method, it is possible to reliably form a molten pool and a keyhole in a workpiece at an initial stage of the start of welding, and welding quality of the workpiece is improved.

Advantageous Effect of Invention

According to the laser processing device according to the present invention, the power distribution of the laser light can be easily controlled. According to the laser processing method according to the present invention, the welding quality of the workpiece is improved.

DESCRIPTION OF EMBODIMENTS

Hereinafter, exemplary embodiments of the present invention will be described in detail with reference to the drawings. Descriptions of preferred exemplary embodiments to be described below are intrinsically examples, and are not intended to limit the present invention, and applications or uses of the present invention.

First Exemplary Embodiment

[Configuration of Laser Processing Device]

Figure 1:
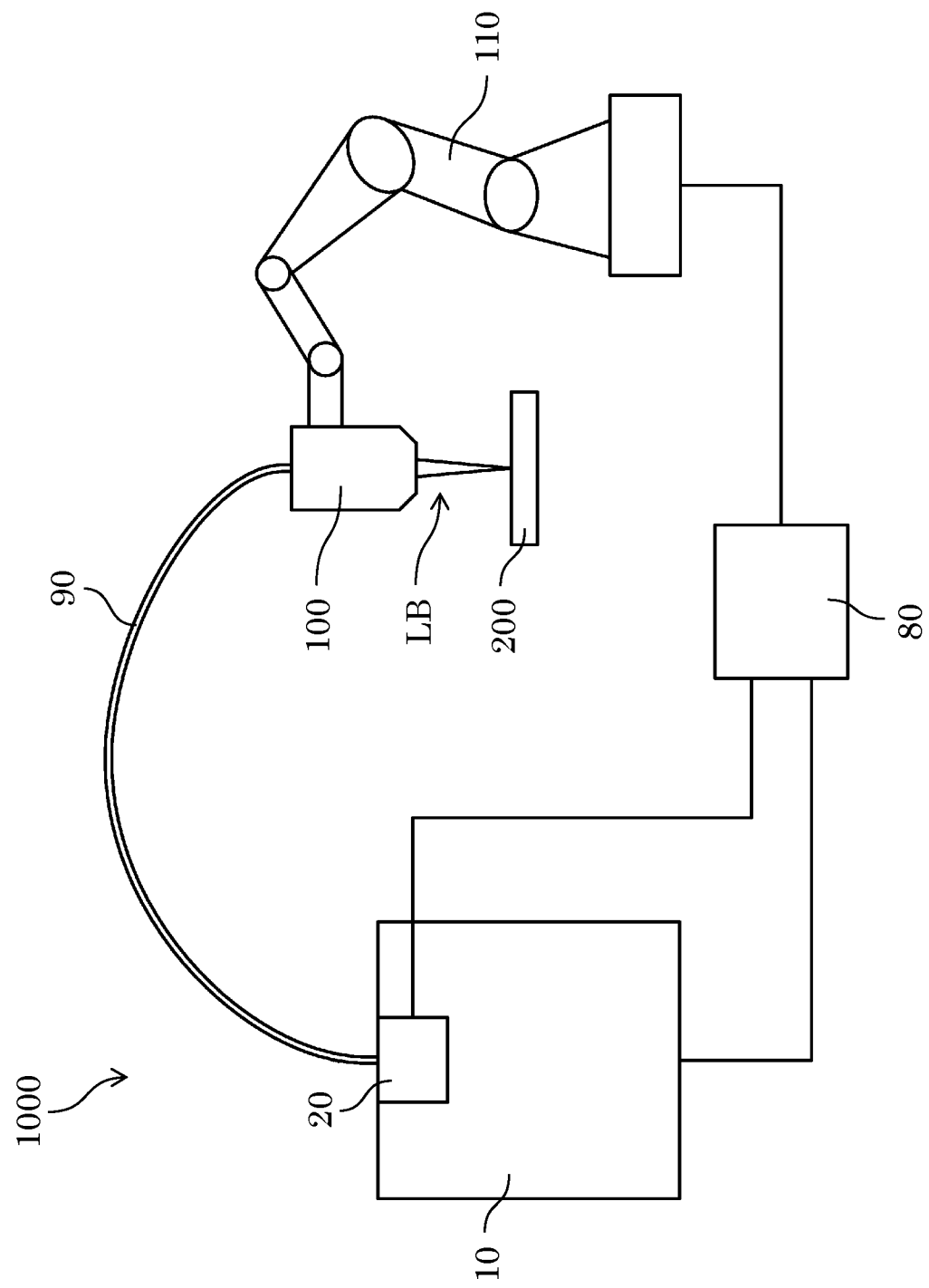
FIG. 1 is a schematic diagram illustrating a configuration of a laser processing device according to a first exemplary embodiment of the present invention.
Figure 2:
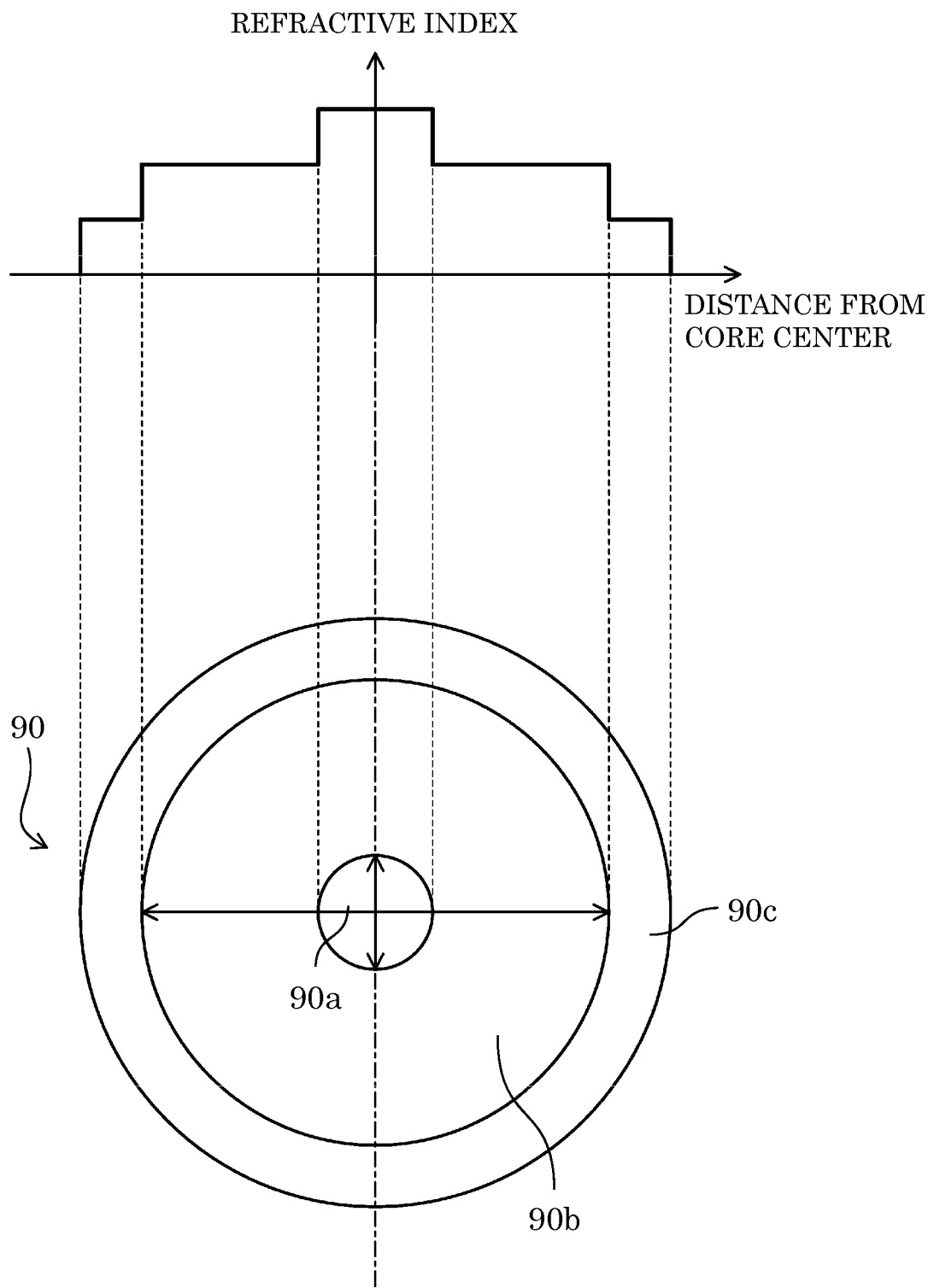
FIG. 2 is a schematic diagram illustrating a refractive index distribution of an optical fiber.

FIG. 1 is a schematic diagram of a configuration of a laser processing device according to the present exemplary embodiment, and laser processing device 1000 includes laser oscillator 10, beam control mechanism 20, controller 80, optical fiber 90, laser light emitting head 100, and manipulator 110. FIG. 2 illustrates a cross-sectional structure and a refractive index distribution of optical fiber 90.

Laser oscillator 10 is a laser light source that receives power supply from a power supply (not illustrated) and generates laser light LB. Laser oscillator 10 may include a single laser light source or may include a plurality of laser modules. In the latter case, laser light rays emitted from the plurality of laser modules are coupled and emitted as laser light LB.

Beam control mechanism 20 is provided in laser oscillator 10, and introduces laser light LB into an incident end face of optical fiber 90 and controls a power distribution of laser light LB emitted from an emission end of optical fiber 90. A configuration and an operation of beam control mechanism 20 will be described later.

Optical fiber 90 is a so-called multi-clad fiber. Optical fiber 90 includes core 90a, first cladding 90b provided coaxially with core 90a on an outer peripheral side of core 90a, and second cladding 90c provided coaxially with core 90a on an outer peripheral side of first cladding 90b. Core 90a, first cladding 90b, and second cladding 90c are mainly made of quartz, and as illustrated in FIG. 2, a refractive index of core 90a is the highest, and refractive indexes of first cladding 90b and second cladding 90c decrease in this order. The refractive indexes of first cladding 90b and second cladding 90c may be adjusted by doping substances of different types or concentrations with which both the refractive indexes can be decreased. The refractive index of core 90a may also be adjusted by doping substances of different types or concentrations with which the refractive indexes can be increased. In optical fiber 90 having such a refractive index distribution, laser light LB incident on core 90a at a predetermined angle can propagate in core 90a without entering first cladding 90b, but laser light LB incident on first cladding 90b at a predetermined angle can propagate in first cladding 90b without entering second cladding 90c. As a structure of the optical fiber for achieving such a propagation method of laser light LB, the structure illustrated in FIG. 2 is merely an example, and core 90a, first cladding 90b, and second cladding 90c do not necessarily have different refractive indexes. For example, core 90a, first cladding 90b, and second cladding 90c may have same refractive index N1, and a thin layer having refractive index N2 (N2<N1) may be provided between core 90a and first cladding 90b and between first cladding 90b and second cladding 90c. Thus, laser light LB incident on core 90a at the predetermined angle can propagate in core 90a without entering first cladding 90b, but laser light LB incident on first cladding 90b at the predetermined angle can propagate in first cladding 90b without entering second cladding 90c. The layer having refractive index N2 is mainly made of quartz, but may be doped with a substance with which the refractive index can be decreased. Laser light LB incident on optical fiber 90 propagates through core 90a and/or first cladding 90b, and reaches the emission end of optical fiber 90. Although not illustrated, a film or a resin-based protective layer that mechanically protects optical fiber 90 is provided on an outer peripheral surface of second cladding 90c.

Laser light emitting head 100 is attached to the emission end of optical fiber 90, and laser-machines workpiece 200 by illuminating laser light LB transmitted through optical fiber 90 to workpiece 200. Optical components (not illustrated), for example, a collimator lens, a condenser lens, a protective glass, and the like are disposed inside laser light emitting head 100.

Controller 80 controls laser oscillation of laser oscillator 10. Specifically, the controller controls laser oscillation by supplying control signals for an output current, an on-time, and the like to a power supply (not illustrated) connected to laser oscillator 10.

Controller 80 performs drive control of motor 70 (see FIGS. 4A and 4B) provided in beam control mechanism 20 according to contents of a selected laser processing program. Controller 80 controls an operation of manipulator 110. The laser processing program is stored in a storage (not illustrated). The storage may be provided inside controller 80 or may be provided outside controller 80 and may be configured to exchange data with controller 80. Controller 80 constitutes a part of beam control mechanism 20.

Manipulator 110 is connected to controller 80, and moves laser light emitting head 100 so as to draw a predetermined trajectory according to the above-described laser processing program. A controller that controls the operation of manipulator 110 may be provided separately.

[Configuration of Beam Control Mechanism]

Figure 3:
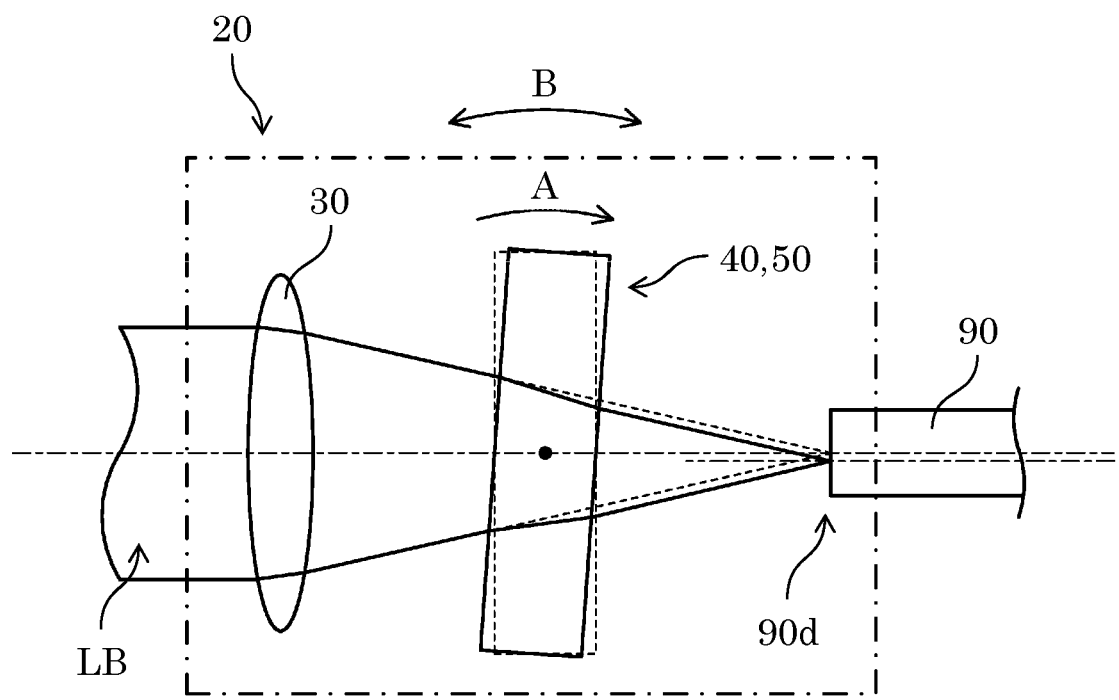
FIG. 3 is a schematic diagram of a beam control mechanism as viewed from an X direction.
Figure 4A:
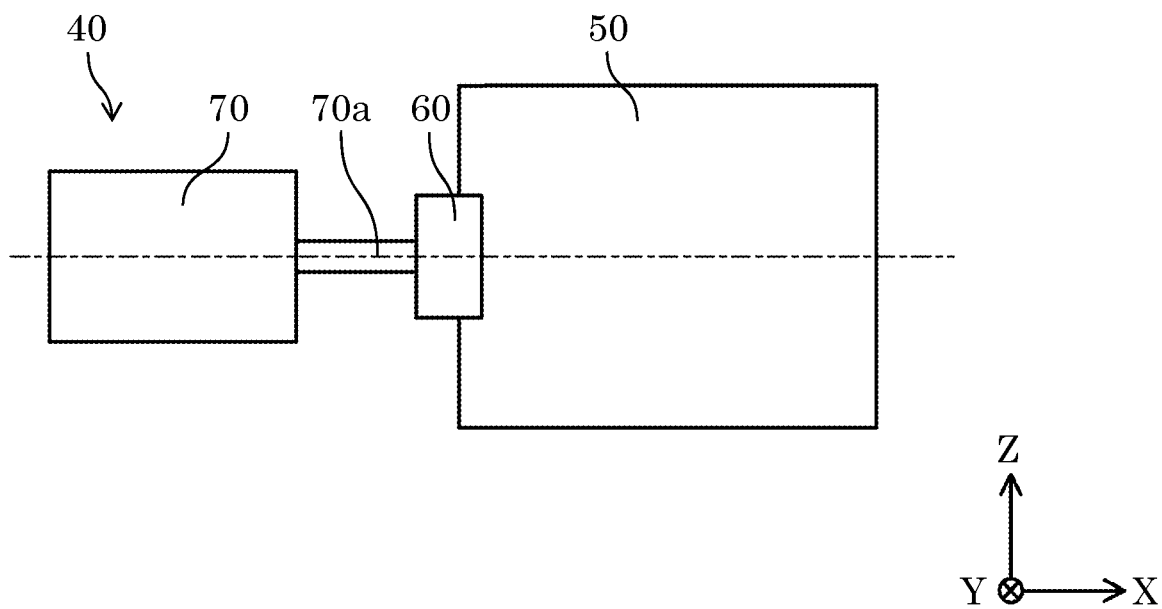
FIG. 4A is a schematic diagram of main parts of the beam control mechanism as viewed from a Y direction.
Figure 4B:
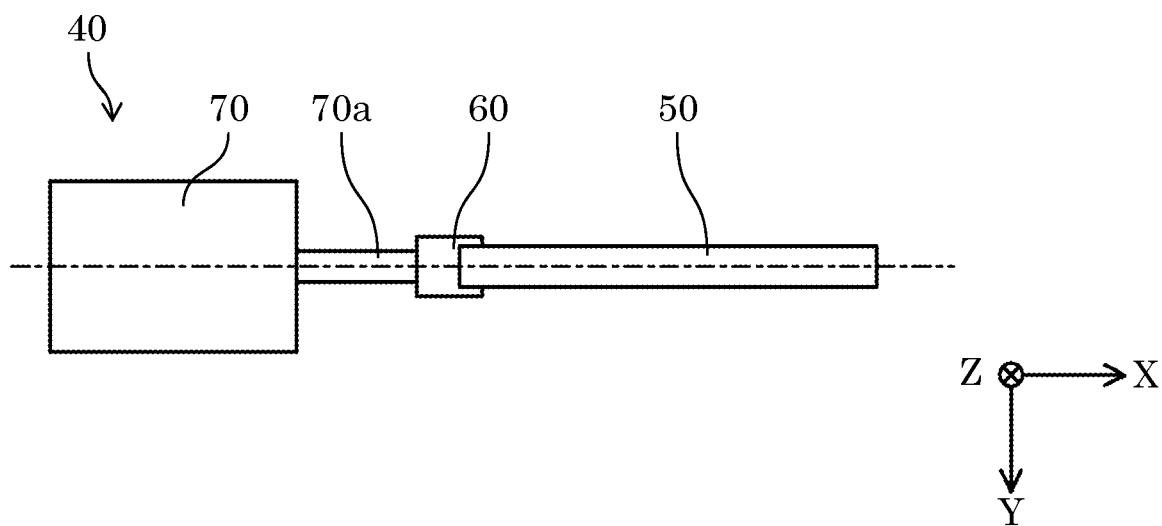
FIG. 4B is a schematic diagram of the main parts of the beam control mechanism as viewed from a Z direction.

FIG. 3 is a schematic diagram of the beam control mechanism as viewed from an X direction, FIG. 4A is a schematic diagram of main parts of the beam control mechanism as viewed from a Y direction, and FIG. 4B is a schematic diagram of the main parts of the beam control mechanism as viewed from a Z direction. In the present specification, in beam control mechanism 20, a traveling direction of laser light LB until the laser light is incident on condenser lens 30 may be referred to as the Z direction, a direction in which output shaft 70a of motor 71 extends may be referred to as the X direction, and a direction substantially orthogonal to the X direction and the Z direction may be referred to as the Y direction. The Z direction is the same as a direction in which an optical axis of laser light LB extends. The X direction is substantially orthogonal to the Z direction. An axis of output shaft 70a of motor 70 may be referred to as an X axis (first axis).

In the present specification, the expression "substantially orthogonal" means being orthogonal, taking into account assembly tolerances of components, and does not mean being strictly orthogonal. Similarly, the expression "substantially equal" means being equal, taking into account manufacturing tolerances and assembly tolerances of components, and does not mean that both targets to be compared are strictly equal. The expression "substantially equal" also means being equal with a predetermined degree of accuracy in comparison with an estimated value, but does not mean that a target to be compared and the estimated value are strictly equal.

As illustrated in FIGS. 3, 4A, and 4B, beam control mechanism 20 includes condenser lens 30, optical member 50, and motor 70. As described above, beam control mechanism 20 includes controller 80. As described later, motor 70 and optical member 50 function as optical path changing and holding mechanism 40 that changes and holds an optical path of laser light LB after being condensed by condenser lens 30.

Laser light LB is incident on condenser lens 30 in a state of collimated light by an optical component (not illustrated), for example, a collimating lens or the like. Condenser lens 30 condenses laser light LB at a predetermined magnification and causes laser light LB to be incident on incident end face 90d of optical fiber 90.

Optical member 50 is a parallel plate-shaped member made of a material transparent to laser light LB. Optical member 50 is made of, for example, quartz and has a refractive index larger than 1 with respect to a wavelength of laser light LB. As optical member 50, a member in which antireflection coating is performed on both surfaces may be used in order to reduce a reflectance to incident laser light LB as much as possible. It is preferable that a reflectance when the antireflection coating is performed is much less than 1%. Optical member 50 is disposed on the optical path of laser light LB between condenser lens 30 and incident end face 90d of optical fiber 90, and laser light LB after being condensed by condenser lens 30 is incident on the optical member.

Motor 70 has output shaft 70a, and is coupled to optical member 50 via holder 60. Motor 70 is driven to rotate output shaft 70a about the X axis, and thus, optical member 50 rotates in a YZ plane about a coupling portion with holder 60. Motor 70 is configured not to rotate only in one direction (direction A illustrated in FIG. 3) but to be rotatable in both forward and reverse directions (direction B illustrated in FIG. 3). A rotation frequency is variable, and can be changed in a range of about several Hz to several kHz when welding is performed. As will be described later, when beam control mechanism 20 is operated, motor 70 does not continuously rotate in one direction but rotates in a predetermined angle range. In other words, optical member 50 tilts at a predetermined angle about the coupling portion with holder 60. Motor 70 can quickly rotate optical member 50 in a reciprocating manner within a set angle range. Motor 70 is connected to controller 80 and is driven by a control signal from controller 80.

A thickness of optical member 50 in the Z direction is about 1 mm to several mm, but is not particularly limited thereto. The thickness can be changed to another value as appropriate in a relationship between a moving distance of laser light LB on incident end face 90d of optical fiber 90 and a rotation angle of motor 70. When the thickness is about several mm, since the optical member is installed at a narrow position through which condensed laser light LB passes between condenser lens 30 and incident end face 90d of optical fiber 90, a required size of the optical member is small, and motor 70 can easily rotate the optical member in the reciprocating manner at a high speed, for example, at a rotation frequency of several kHz.

[Procedure for Changing Power Distribution of Laser Light]

Next, a procedure for changing the power distribution of laser light LB will be described.

Figure 5A:
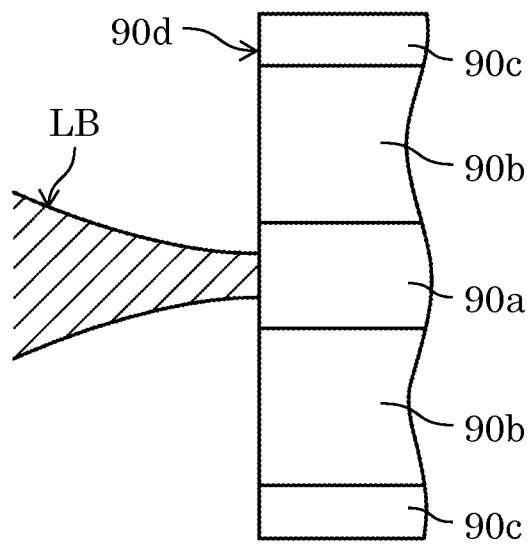
FIG. 5A is a schematic diagram illustrating a state near an incident end of the optical fiber when an incident position of laser light is on the core.
Figure 5B:
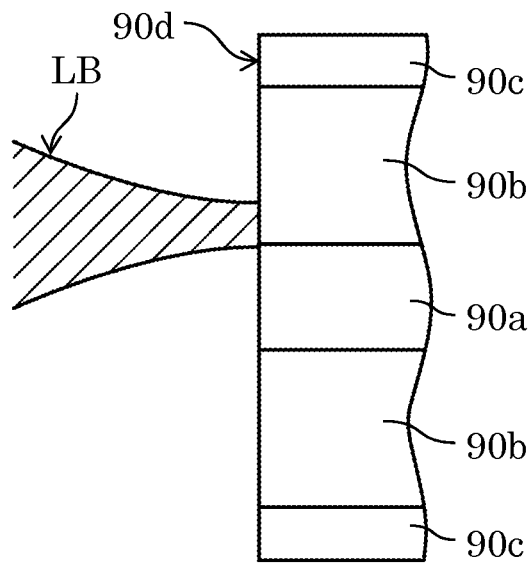
FIG. 5B is a schematic diagram illustrating the state near the incident end of the optical fiber when the incident position of the laser light is changed.

FIGS. 5A and 5B illustrate a state near an incident end of the optical fiber when an incident position of the laser light is changed.

When output shaft 70a of motor 70 is at an initial position, optical member 50 is disposed so as to be substantially orthogonal to the optical axis of laser light LB. In this state, as illustrated in FIG. 5A, laser light LB is incident on core 90a on incident end face 90d of optical fiber 90.

Subsequently, when motor 70 is rotated at a predetermined angle in direction A illustrated in FIG. 3 by a control signal from controller 80, optical member 50 tilts at a predetermined angle in the YZ plane about the coupling portion with holder 60 according to the rotation of motor 70. According to this angle, an angle between a light incident surface of optical member 50 and the optical axis of laser light LB changes, and the optical path of laser light LB is changed inside optical member 50. Laser light LB whose optical path is changed is incident on incident end face 90d of optical fiber 90, and the incident position of the laser light changes. For example, as illustrated in FIG. 5B, in incident end face 90d of optical fiber 90, a large part of laser light LB is incident on first cladding 90b, but a small part of the laser light is also incident on core 90a.

As described above, motor 70 is driven to tilt optical member 50, and thus, the incident position of laser light LB on incident end face 90d of optical fiber 90 can be continuously changed. The incident position of laser light LB is changed, and thus, for example, a power ratio between laser light LB transmitted to core 90a and laser light LB transmitted to first cladding 90b can be changed.

Figure 6:
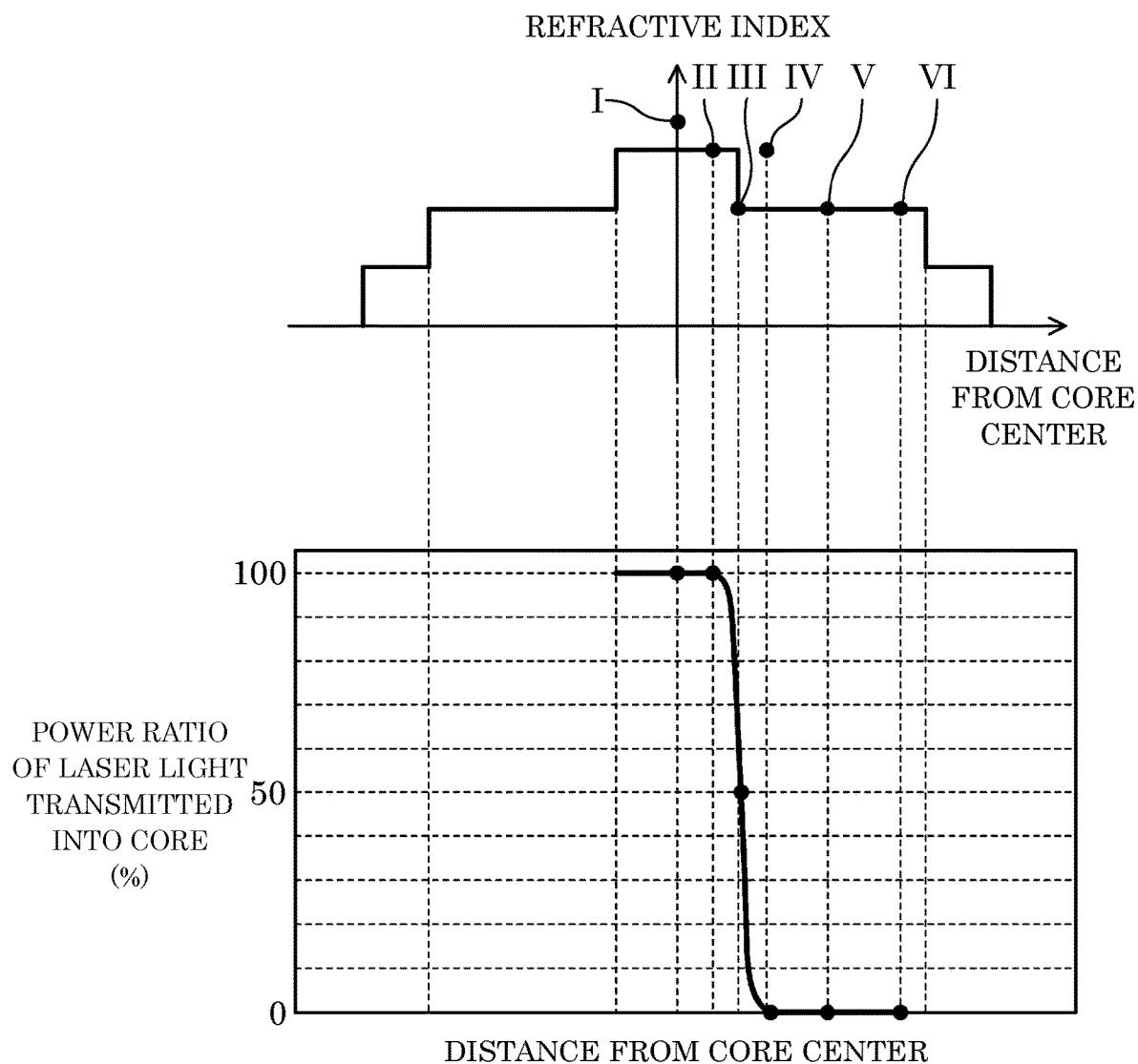
FIG. 6 is a diagram illustrating a relationship between the incident position of the laser light on an incident end face of the optical fiber and a power ratio of laser light transmitted into a core.
Figure 7:
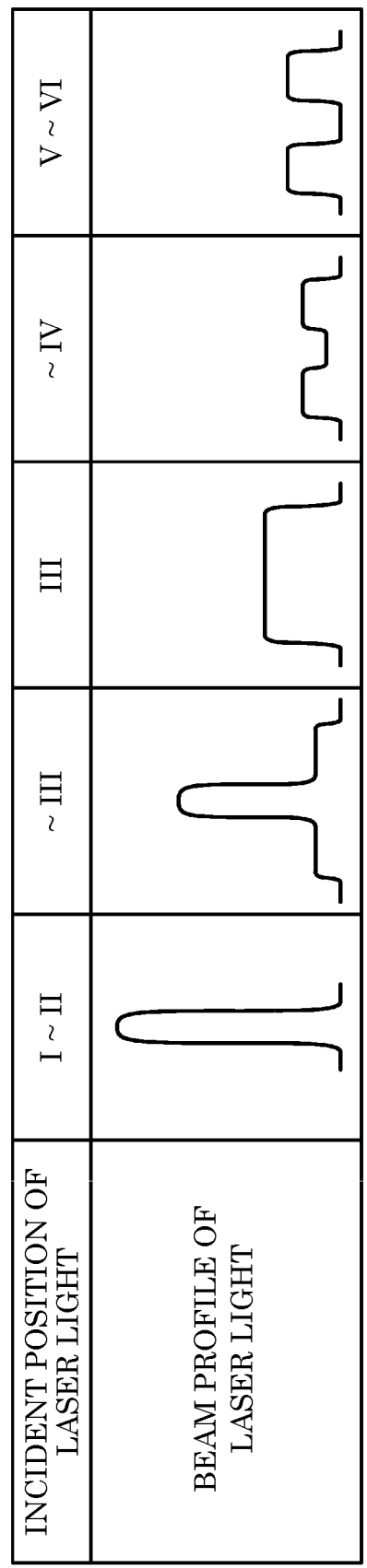
FIG. 7 is a diagram illustrating a relationship between the incident position of the laser light on the incident end face of the optical fiber and a beam profile of laser light emitted from a laser light emitting head.

FIG. 6 illustrates a relationship between the incident position of the laser light on the incident end face of the optical fiber and the power ratio of the laser light transmitted into the core, and FIG. 7 illustrates a relationship between the incident position of the laser light on the incident end face of the optical fiber and a beam profile of the laser light emitted from the laser light emitting head. The beam profile illustrated in FIG. 7 corresponds to a power distribution of laser light LB that is emitted from laser light emitting head 100 and forms an image at a focal position. The beam profile illustrated in FIG. 7 also corresponds to a power distribution of laser light LB emitted from the emission end of optical fiber 90.

When the incident position of laser light LB is I illustrated in FIG. 6, 100% of laser light LB incident inside core 90a, and the beam profile of laser light LB has a unimodal shape with a narrow half-width as illustrated in FIG. 7 (incident positions of laser light LB: I to II).

Similarly, until the incident position of laser light LB approaches first cladding 90b from core 90a and reaches position II illustrated in FIG. 6, 100% of laser light LB is incident on core 90a, and the beam profile is maintained in the unimodal shape.

On the other hand, when the incident position of laser light LB is between II and III illustrated in FIG. 6, that is, when laser light LB is incident up to near a boundary portion between core 90a and first cladding 90b, several % to 50% or less of laser light LB is incident on first cladding 90b. Thus, as illustrated in FIG. 7, the beam profile changes so as to include a unimodal portion and terrace portions having a wide half-width formed around the unimodal portion (incident position of laser light LB: ~ III). The former corresponds to laser light LB incident on core 90a, and the latter corresponds to laser light LB incident on first cladding 90b. As the power ratio of laser light LB incident on core 90a decreases, a peak value of the unimodal portion decreases.

When the incident position of laser light LB is position III illustrated in FIG. 6, the power ratio of laser light LB incident on core 90a is equal to the power ratio of laser light LB incident on first cladding 90b. When a cross-sectional area of core 90a is equal to a cross-sectional area of first cladding 90b, a peak value of the unimodal portion and peak values of the terrace portions of the beam profile coincide. As illustrated in FIG. 7, the entire beam profile of laser light LB has a unimodal shape, but a peak value is low and the half-width is large as compared with a case where laser light LB is incident on only core 90a (incident position of laser light LB: III). On the other hand, when the cross-sectional area of core 90a is smaller than the cross-sectional area of first cladding 90b, as illustrated in FIG. 7, the beam profile has a shape including a unimodal portion and terrace portions having a wide half-width formed on both sides of the unimodal portion (incident position of laser light LB: ~III). When the cross-sectional area of core 90a is larger than the cross-sectional area of first cladding 90b, the beam profile has a bimodal shape (incident position of laser light LB: ~IV) as illustrated in FIG. 7.

As the incident position of laser light LB moves away from core 90a (between III and IV illustrated in FIG. 6), a power of laser light LB incident on core 90a decreases, and a power ratio of laser light LB incident on first cladding 90b increases. As a result, as illustrated in FIG. 7, a peak value of a portion of the beam profile corresponding to a component transmitted into core 90a decreases, a peak value of a portion corresponding to a component transmitted into first cladding 90b increases, and the beam profile has a bimodal shape (incident position of laser light LB: ~ IV). The peak value in the beam profile of the bimodal shape is lower than the peak value of the beam profile of the unimodal shape obtained when the incident position of laser light LB is I illustrated in FIG. 6. Although not illustrated, when the incident position of the laser is further separated from core 90a (between IV and V illustrated in FIG. 6), the power of laser light LB incident on core 90a becomes 0%, and 100% of laser light LB is incident on first cladding 90b.

When the incident position of laser light LB is completely within second cladding 90c, as illustrated in FIG. 7, the peak value of the portion of the beam profile corresponding to the component transmitted into core 90a decreases to 0%, the peak value of the portion corresponding to the component transmitted into first cladding 90b is maximized, and the beam profile has a bimodal shape with a highest peak value (in the case of the incident positions of laser light LB: V to VI). The peak value in the beam profile of the bimodal shape is lower than the peak value of the beam profile of the unimodal shape obtained when the incident position of laser light LB is I illustrated in FIG. 6.

As described above, motor 70 is driven to tilt optical member 50, and thus, the incident position of laser light LB on incident end face 90d of optical fiber 90 can be changed. The incident position of laser light LB is changed, and thus, for example, the beam profile, that is, the power distribution of laser light LB emitted from laser light emitting head 100 can be changed.

The beam profile of laser light LB emitted from laser light emitting head 100 is changed, and thus, it is possible to improve a processed shape of workpiece 200, for example, a welded shape. A further description will be given below.

Figure 8:
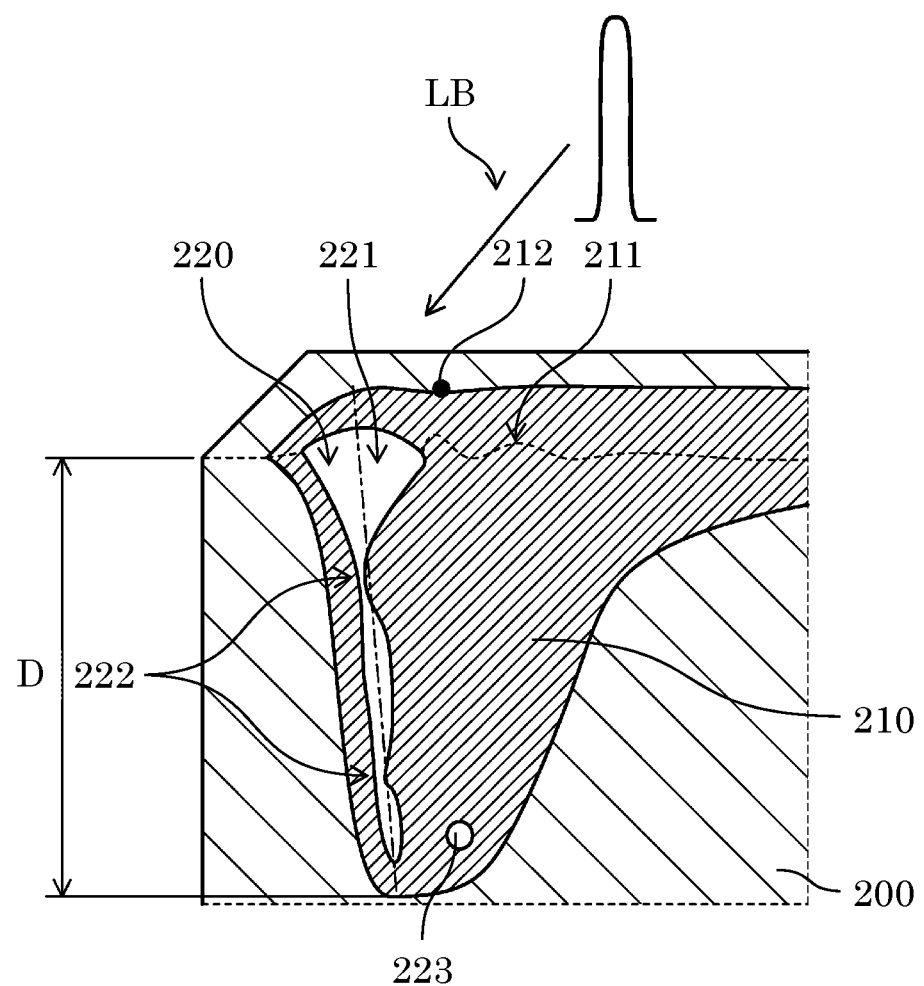
FIG. 8 is a schematic cross-sectional view of a welded portion of a workpiece for comparison.
Figure 9:
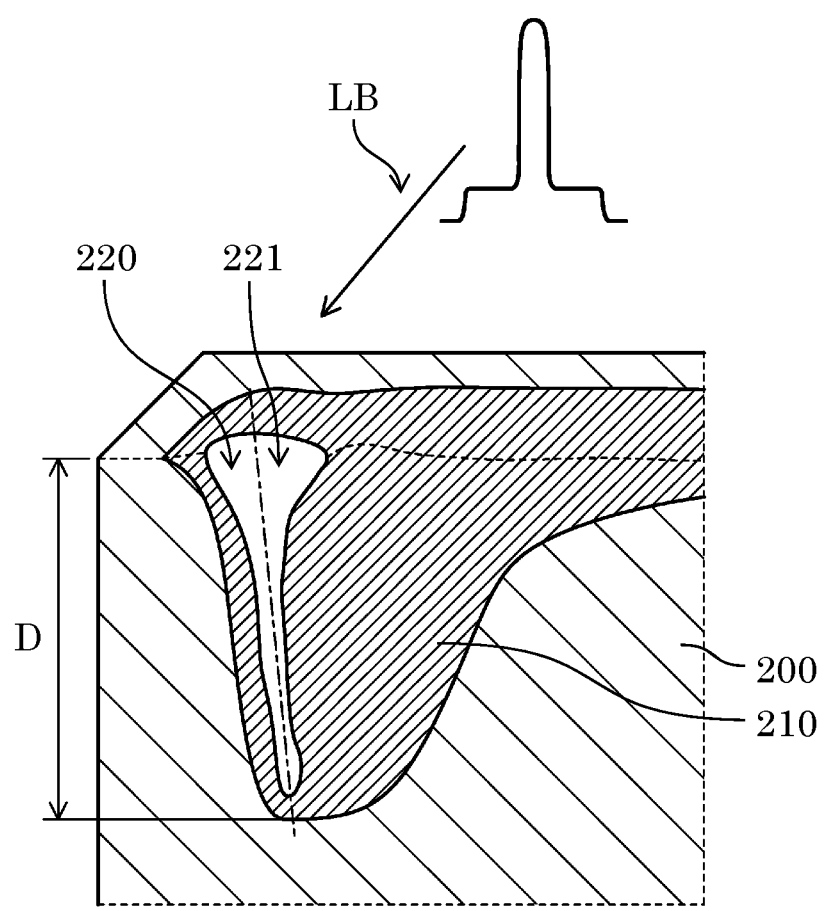
FIG. 9 is a schematic cross-sectional view of a welded portion of the workpiece according to the first exemplary embodiment.

FIG. 8 is a schematic cross-sectional view of a welded portion of a workpiece for comparison, and FIG. 9 is a schematic cross-sectional view of a welded portion of the workpiece according to the present exemplary embodiment.

In general, when workpiece 200 made of metal is laser-welded, a portion illuminated by laser light LB is heated to cause weld-penetration, and molten pool 210 is formed. In the portion illuminated by laser light LB, a material constituting workpiece 200 evaporates on a surface, and keyholes 220 are formed inside workpiece 200 by a recoiling force.

In the example illustrated in FIG. 8, laser light LB is transmitted only into core 90a of optical fiber 90 and is illuminated to workpiece 200 from laser light emitting head 100, and a power density of laser light LB at the welded portion is high and a spot diameter of illuminated laser light LB is small.

In such a case, the weld-penetration of workpiece 200 is likely to be formed, and keyhole 220 becomes deep. Meanwhile, opening 221 of keyhole 220 does not expand so much, and as illustrated in FIG. 8, constricted portion 222 may be generated inside keyhole 220. Constricted portion 222 is closed, and thus, air bubbles 223 remain inside workpiece 200. When closed constricted portion 222 becomes keyhole 220 again, the molten metal is rapidly ejected from the inside of keyhole 220 toward the surface. Thus, spatter 212 is formed and adhere to the surface of workpiece 200 or a surface of molten pool 210 is wavy. Since molten pool 210 is rapidly cooled and solidified after passage of laser light LB, when such a wave is generated, unevenness 211 (also referred to as rear vibration part 211) is caused on the surface of workpiece 200 at the rear of molten pool 210 along the traveling direction of the laser welding.

This wave is reflected at a boundary between molten pool 210 and the solidified portion and bounces back. When the reflected wave reaches keyhole 220, the reflected wave flows so as to fill keyhole 220. Since the flowed molten metal is rapidly heated by laser light LB, and metal vapor is rapidly generated, a cylindrical shape of keyhole 220 may be disturbed. The shape disturbance of keyhole 220, the generation of air bubble 223, and spatter 212 and unevenness 211 caused on the surface of workpiece 200 described above are factors that deteriorate welding quality.

On the other hand, according to the present exemplary embodiment, the power distribution of laser light LB emitted from laser light emitting head 100 toward workpiece 200 can be changed by using beam control mechanism 20. Thus, for example, workpiece 200 can be illuminated by laser light LB having the beam profile as illustrated in FIG. 9 by adjusting a tilt angle of optical member 50 and changing the power ratio between laser light LB transmitted into core 90a and laser light LB transmitted into first cladding 90b.

In such a case, although weld-penetration depth D is slightly shallower than a depth in the case illustrated in FIG. 8, desired weld-penetration depth D is obtained by laser light LB emitted from core 90a. On the other hand, opening 221 of keyhole 220 can be expanded by laser light LB emitted from first cladding 90b as compared with the case illustrated in FIG. 8. Inner wall surfaces of keyholes 220 are also illuminated by laser light LB, and laser light LB is absorbed by workpiece 200 while laser light LB reaches the inside of keyholes 220 by multiple reflection. Accordingly, it is possible to prevent the inner wall surfaces of keyholes 220 from being stuck to each other to form constricted portion 222, and eventually, it is possible to prevent air bubbles 223 from being generated inside workpiece 200. The molten metal from the inside of keyhole 220 toward the surface is prevented from being rapidly ejected, and thus, it is possible to reduce unevenness 211 formed on the surface of workpiece 200 at the rear of molten pool 210. It is possible to prevent the shape disturbance of keyhole 220. As described above, the welding quality in the laser welding can be improved.

The welding quality can be improved by switching between the power distributions of laser light LB emitted from laser light emitting head 100 during the laser welding.

Figure 10:
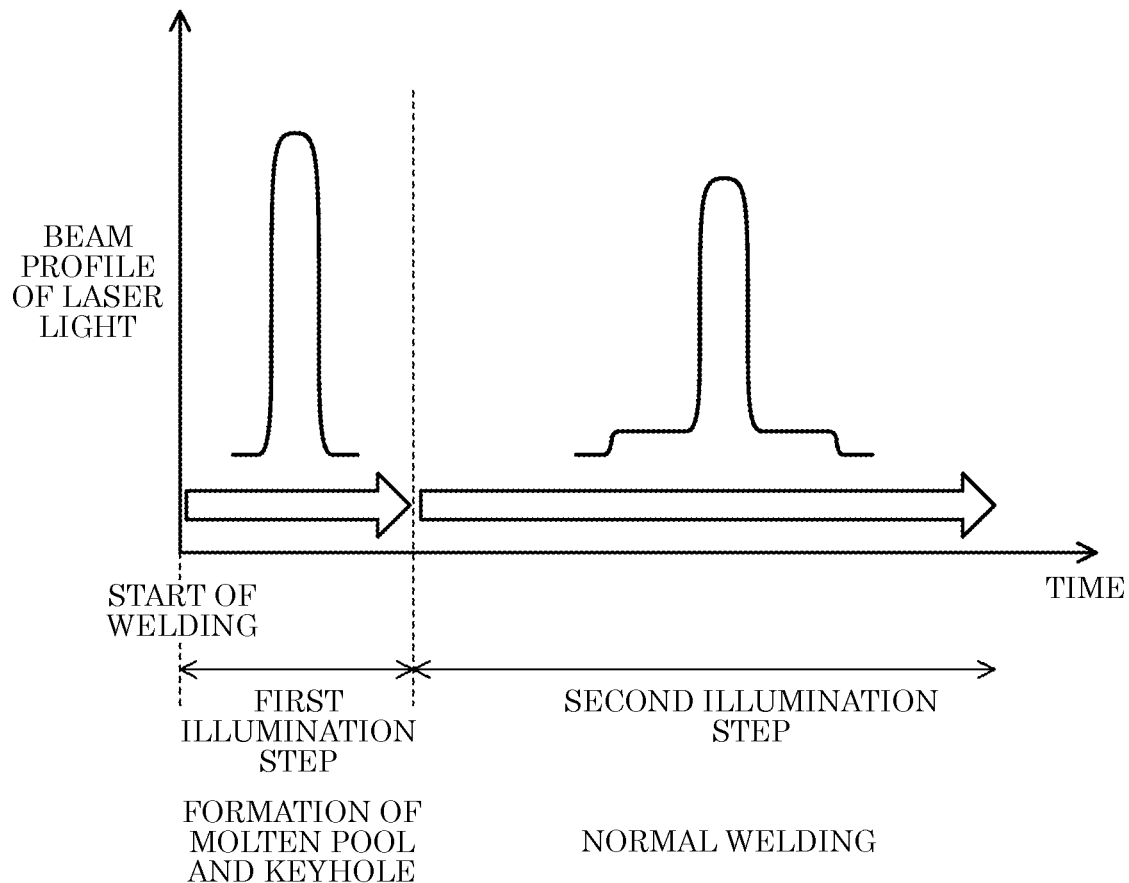
FIG. 10 is a welding sequence of the workpiece.

FIG. 10 illustrates a welding sequence of the workpiece, and molten pool 210 is not formed in workpiece 200 immediately after the start of welding. It is preferable that desired weld-penetration depth D is obtained immediately after the start of welding. Thus, controller 80 drives motor 70 to cause laser light LB to be incident on only core 90a. Accordingly, the spot diameter of laser light LB illuminated to workpiece 200 is reduced, and the power density of laser light LB at the welded portion is increased (first illumination step). On the other hand, after molten pool 210 and keyhole 220 are formed, it is preferable that constricted portion 222 and the like as described above are prevented from being formed. Thus, controller 80 drives motor 70 to cause laser light LB to be incident on core 90a and first cladding 90b. Accordingly, opening 221 of keyholes 220 is expanded, and desired weld-penetration depth D is obtained (second illumination step).

In this manner, in the laser welding, molten pool 210 and keyhole 220 can reliably be formed in workpiece 200, and the welding quality can be improved by preventing air bubble 223 inside workpiece 200, unevenness 211 on the surface, and the like from being generated.

The present invention is not limited thereto. Beam control mechanism 20 is operated according to the material of workpiece 200 and/or the shape of the portion of workpiece 200 to be laser-machined, and thus, the power distribution of laser light LB emitted from laser light emitting head 100 is controlled. Accordingly, workpieces 200 having various materials and shapes can be laser-machined, and processing quality can be improved.

[Effects and Others]

As described above, laser processing device 1000 according to the present exemplary embodiment includes at least laser oscillator 10 that generates laser light LB, optical fiber 90 that has at least core 90a, first cladding 90b provided coaxially with core 90a on the outer peripheral side of core 90a, and second cladding 90c provided coaxially with core 90a on the outer peripheral side of first cladding 90b and has incident end face 90d and an emission end opposite to incident end face 90d, beam control mechanism 20 that is provided in laser oscillator 10 and introduces laser light LB into incident end face 90d of optical fiber 90, and laser light emitting head 100 that is attached to the emission end of optical fiber 90 and illuminates laser light LB to workpiece 200.

Beam control mechanism 20 includes condenser lens 30 that receives laser light LB generated by laser oscillator 10 and condenses laser light LB at a predetermined magnification, optical path changing and holding mechanism 40 that is disposed on the optical path of laser light LB between condenser lens 30 and incident end face 90d of optical fiber 90 and changes and holds the optical path of laser light LB, and controller 80 that controls the operation of optical path changing and holding mechanism 40. In the present exemplary embodiment, optical path changing and holding mechanism 40 includes optical member 50 having the parallel plate shape, and motor 70 coupled to optical member 50. In the present exemplary embodiment, controller 80 controls the operation of motor 70.

Beam control mechanism 20 controls the power distribution of laser light LB emitted from laser light emitting head 100 by changing the incident position of laser light LB on incident end face 90d of optical fiber 90.

As described above, the optical path of laser light LB can be easily changed by providing optical path changing and holding mechanism 40 on the optical path of laser light LB between condenser lens 30 and incident end face 90d of optical fiber 90. For example, as described in PTL 2, even though optical member 50 is disposed in front of condenser lens 30, since laser light LB after passing through condenser lens 30 forms an image at the focal position, the optical path of the laser light cannot be changed.

On the other hand, according to the present exemplary embodiment, the incident position of laser light LB on incident end face 90d of optical fiber 90 can be easily changed by providing optical member 50 having the parallel plate shape at the above-described position, and the power distribution of laser light LB emitted from laser light emitting head 100 can be easily controlled.

It is preferable that laser light LB is converted into the collimated light before being incident on condenser lens 30.

In this manner, since the optical path and the optical axis of laser light LB emitted from condenser lens 30 are constant, the optical path of laser light LB can be easily changed by optical path changing and holding mechanism 40.

Optical member 50 is provided to transmit laser light LB and to be tiltable about the X axis (first axis) intersecting with the optical axis of laser light LB. Controller 80 drives motor 70 to tilt optical member 50 about the X axis, and thus, beam control mechanism 20 changes the incident position of laser light LB on incident end face 90d of optical fiber 90.

Parallel plate-shaped optical member 50 disposed on the optical path of laser light LB is tilted about the X axis, and thus, the optical path of laser light LB can be reliably and quickly changed. Accordingly, the power distribution of laser light LB emitted from laser light emitting head 100 can be quickly changed. In particular, when the thickness of optical member 50 is about 1 mm to several mm, since optical member 50 is installed at the narrow position through which condensed laser light LB passes between condenser lens 30 and incident end face 90d of optical fiber 90, the required size of the optical member is small, and it is easy to quickly tilt the optical member by motor 70. It is easy to rotate the optical member in the reciprocating manner with the predetermined angle range.

Since optical member 50 is disposed in advance on the optical path of laser light LB between condenser lens 30 and incident end face 90d of optical fiber 90 and is tilted to change the optical path of laser light LB, laser light LB is not obscured inside the laser device as disclosed in PTL 2. Accordingly, the laser device can be prevented from being damaged, and high processing quality of the laser processing can be maintained.

Beam control mechanism 20 causes laser light LB to be incident on at least one of core 90a and first cladding 90b.

In this manner, the power distribution of laser light LB emitted from laser light emitting head 100 can be easily changed in multiple stages.

Beam control mechanism 20 controls the power distribution of laser light LB emitted from laser light emitting head 100 according to at least one of the material of workpiece 200 and the shape of the portion of workpiece 200 to be laser-machined.

In this manner, workpieces 200 having various materials and shapes can be laser-machined, and the processing quality can be improved. When laser processing device 1000 according to the present exemplary embodiment is used for the laser welding, a weld bead having a good outer appearance can be formed.

It is preferable that beam control mechanism 20 is configured to switch between the power distributions of laser light LB emitted from laser light emitting head 100 during the laser processing of workpiece 200.

A laser processing method according to the present exemplary embodiment includes at least a first illumination step of illuminating laser light LB having a first power distribution to workpiece 200 and a second illumination step of subsequently illuminating laser light LB having a second power distribution different from the first power distribution to workpiece 200.

Molten pool 210 and keyholes 220 are formed on the surface of workpiece 200 in the first illumination step, and opening 221 of keyholes 220 is expanded and molten pool 210 is grown to have a desired weld-penetration depth D in the second illumination step.

In this manner, for example, the power distribution of laser light LB illuminated to workpiece 200 is narrowed, and molten pool 210 and keyhole 220 can reliably be formed at the start of welding. After molten pool 210 and keyholes 220 are formed, opening 221 of keyholes 220 is expanded by expanding the power distribution of laser light LB illuminated to workpiece 200. Thus, it is possible to prevent air bubble 223 inside workpiece 200 from being generated, unevenness 211 and spatter 212 from being caused on the surface, and the shape of keyholes 220 from being disturbed, and it is possible to improve the welding quality. A weld bead having a good outer appearance can be formed.

Second Exemplary Embodiment

Figure 11:
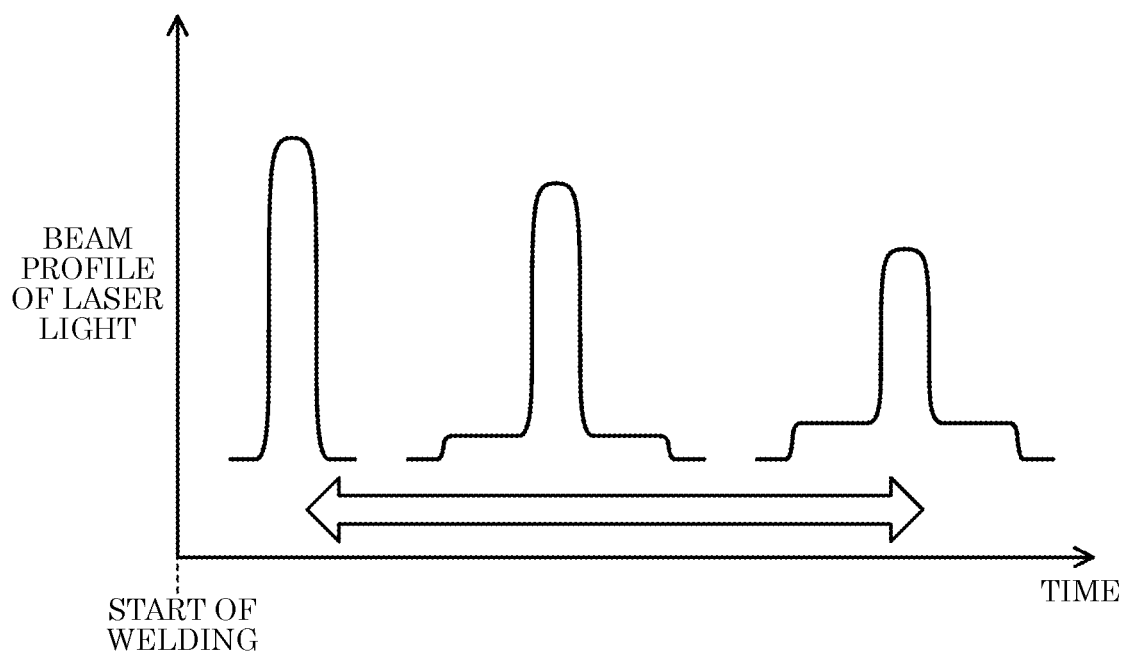
FIG. 11 is a welding sequence of a workpiece according to a second exemplary embodiment.
Figure 12:
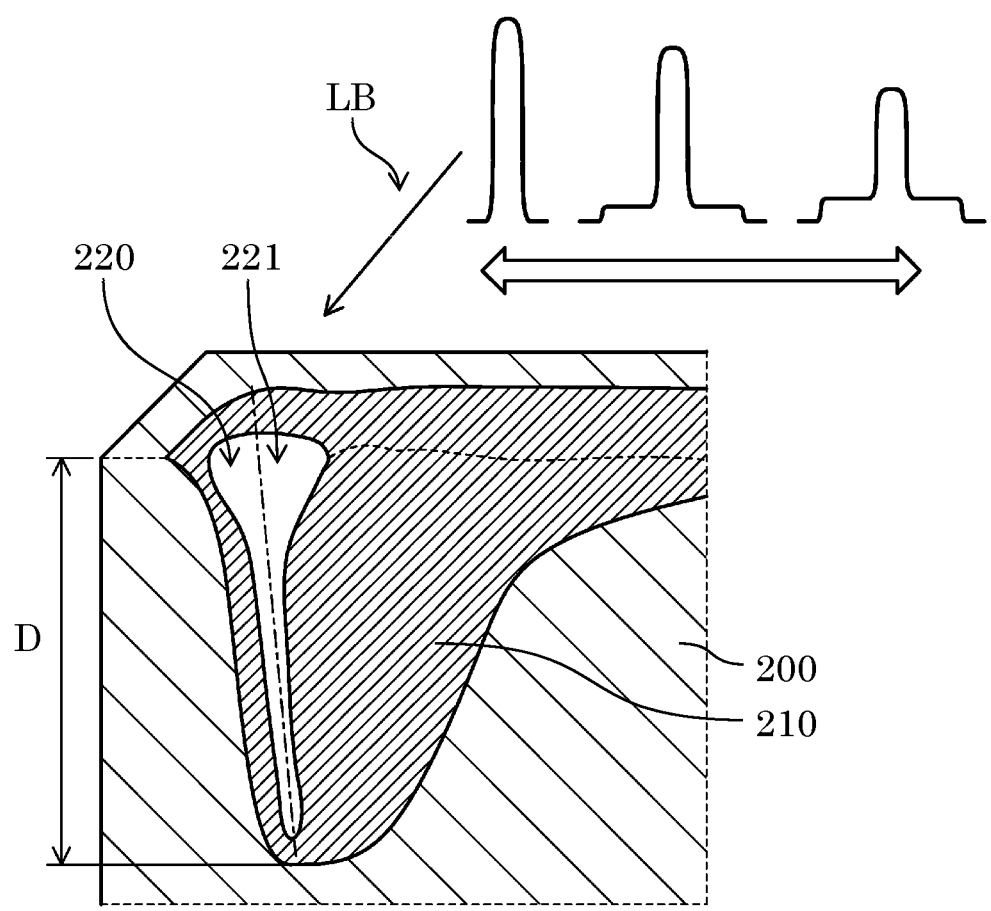
FIG. 12 is a schematic cross-sectional view of a welded portion of the workpiece.

FIG. 11 illustrates a welding sequence of a workpiece according to the present exemplary embodiment, and FIG. 12 illustrates a schematic cross-sectional view of a welded portion of the workpiece. In FIGS. 11 and 12, the same portions as the portions in the first exemplary embodiment are denoted by the same reference marks, and the detailed description will be omitted.

When motor 70 is rotated in the reciprocating manner within a predetermined angle range (direction B illustrated in FIG. 3), optical member 50 also rotates in a reciprocating manner within a predetermined angle range accordingly. A rotation frequency is set to about several Hz to several kHz. That is, beam control mechanism 20 is configured to switch between the power distributions of laser light LB emitted from laser light emitting head 100 during laser processing of workpiece 200.

In this case, as illustrated in FIG. 11, the power distribution of laser light LB emitted from an emission end of laser light emitting head 100 changes periodically and continuously. Specifically, a beam profile having a unimodal peak continuously changes to a beam profile including a unimodal portion and terrace portions having a wide half-width formed on both sides of the unimodal portion, and the change is periodically repeated. The rotation frequency of optical member 50 corresponds to a frequency at which the power distribution of laser light LB changes.

In this manner, for example, keyhole 220 is prevented from being excessively narrowed while molten pool 210 and keyhole 220 are reliably formed in workpiece 200, and the laser welding in which the generation of air bubble 223 and spatter 212 is suppressed can be performed.

The power distributions of laser light LB are periodically switched at a predetermined frequency, in this case, at a frequency substantially equal to a natural vibration frequency of keyhole 220 formed in workpiece 200, and thus, it is possible to effectively prevent the shape of keyhole 220 from being disturbed and unevenness 211 to be formed at the rear of molten pool 210 described above from being caused. A further description will be given below.

While molten pool 210 is sequentially formed along the traveling direction of the laser welding, keyhole 220 also moves along the traveling direction of the laser welding. At this time, keyhole 220 vibrates by repeating expansion and contraction in a diametrical direction and/or a depth direction at a natural vibration frequency (hereinafter, simply referred to as a natural vibration frequency). The natural vibration frequency is a value determined by a size of molten pool 210, a viscosity at the time of melting constituent metal of molten workpiece 200, and the like, and is estimated to be about several Hz to several kHz in many cases.

The power distribution of laser light LB illuminated to workpiece 200 is periodically changed at a frequency substantially equal to the natural vibration frequency, and thus, the shape of keyholes 220 is stabilized. As illustrated in FIG. 12, it is possible to prevent constricted portion 222 from being generated inside workpiece 200 and air bubble 223 from being generated. Unevenness 211 formed at the rear of molten pool 210 can be reduced.

The method for periodically and continuously changing the power distribution of laser light LB described above is particularly effective for thick plate welding. This is because, since a required weld-penetration depth increases as a plate thickness increases and keyhole 220 also increases in depth, in order to achieve the weld-penetration depth, there is a high probability that a welding defect due to instability (for example, constriction or the like) of keyhole 220 increases.

Modification Example

When a shape of a portion of workpiece 200 to be laser-welded changes along the traveling direction of the laser welding, good laser welding can be performed by appropriately switching between the power distributions of laser light LB illuminated to workpiece 200 according to the shape of the portion to be welded. An exemplary case will be further described with reference to FIG. 13.

Figure 13:
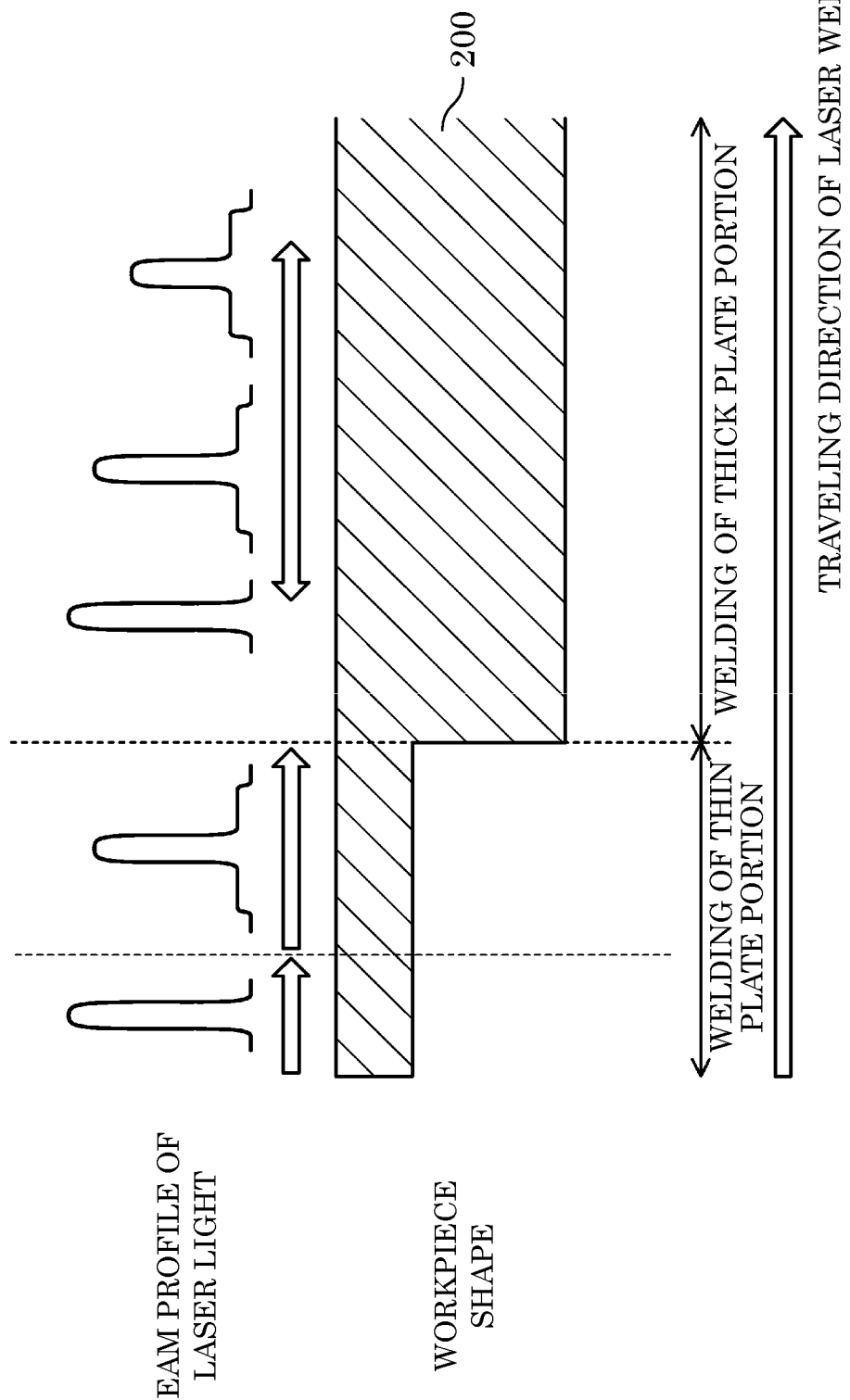
FIG. 13 is a welding sequence of a workpiece according to a modification example.

FIG. 13 illustrates a welding sequence of a workpiece according to the present modification example, and workpiece 200 has a shape having a thin plate portion and a thick plate portion continuous with the thin plate portion. A thickness of the thick plate portion is more than a thickness of the thin plate portion.

First, when the thin plate portion is laser-welded, workpiece 200 is illuminated by laser light LB in the sequence illustrated in FIG. 10. In the thin plate portion having a thickness equal to or less than a predetermined thickness, a weld-penetration depth D may not be deep. Thus, after workpiece 200 is illuminated by laser light LB with a beam profile having a unimodal peak at the start of welding and molten pool 210 and keyholes 220 are formed, the power distribution of laser light LB is changed to be broad, and constricted portion 222 is prevented from being formed in keyholes 220.

Subsequently, when the welding of the thin plate portion is ended and the welding of the thick plate portion is started, workpiece 200 is illuminated by laser light LB in the sequence illustrated in FIG. 11. That is, workpiece 200 is illuminated by laser light LB while the power distribution of laser light LB is periodically changed at the natural vibration frequency.

In this manner, welding defects such as air bubbles 223 inside workpiece 200 and unevenness 211 and spatter 212 on the surface of workpiece 200, which are likely to occur in the thick plate welding, can be prevented as described above while the penetration depth D is increased, and the welding quality can be improved.

Depending on the material of workpiece 200 and the thickness of the thin plate portion, the thin plate portion may be welded in a state where laser light LB is fixed such that the power distribution becomes broad from the beginning.

Other Exemplary Embodiments

In the first and second exemplary embodiments including the modification example, although the multi-clad fiber having the structure illustrated in FIG. 2 has been described as an example, other structures may be used. For example, one or a plurality of claddings may be provided on the outer peripheral side of second cladding 90c. In this case, the refractive indexes of the claddings provided outside second cladding 90c may be sequentially lowered. The cladding on which laser light LB can be incident may be up to the cladding excluding the outermost cladding. Of course, a film or a resin-based protective layer for mechanically protecting the fiber is provided outside the outermost cladding.

An output and a wavelength of laser light LB can be appropriately changed depending on a material and a shape of workpiece 200 or processing contents.

In the first and second exemplary embodiments, optical member 50 is tilted about the X axis, but may be tilted about an axis extending in the Y direction. In this case, positions of motor 70 and holder 60 are changed such that output shaft 70a of motor 70 extends in the Y direction. In order to tilt optical member 50, an actuator other than motor 70, for example, a piezoelectric actuator or the like may be used.

In the present specification, although so-called keyhole type laser welding in which keyhole 220 is formed in molten pool 210 has been described as an example, the type of the laser welding can be appropriately selected depending on the material and shape of workpiece 200, the required weld-penetration depth, a width of the weld bead, and the like. It goes without saying that laser machining device 1000 and the welding sequence described above can be applied not only to the laser welding but also to laser cutting.

INDUSTRIAL APPLICABILITY

The laser processing device according to the present invention is useful for processing workpieces having various materials or shapes since it is possible to control the power distribution of the laser light illuminated to the workpiece with a simple configuration.

REFERENCE MARKS IN THE DRAWINGS

10: laser oscillator
20: beam control mechanism
30: condenser lens
40: optical path changing and holding mechanism
50: optical member
60: holder
70: motor
70a: output shaft
80: controller
90: optical fiber
90a: core
90b: first cladding
90c: second cladding
90d: incident end face
100: laser light emitting head
110: manipulator
200: workpiece
210: molten pool
220: keyhole
221: opening
1000: laser processing device
LB: laser light

The invention claimed is:

1. A laser processing device, comprising at least:
a laser oscillator that generates laser light;
an optical fiber that includes at least a core, a first cladding provided coaxially with the core on an outer peripheral side of the core, and a second cladding provided coaxially with the core on an outer peripheral side of the first cladding, and includes an incident end face and an emission end opposite to the incident end face;
a beam control mechanism that is provided in the laser oscillator, introduces the laser light into the incident end face of the optical fiber, and controls a power distribution of the laser light emitted from the emission end of the optical fiber; and
a laser light emitting head that is attached to the emission end of the optical fiber and illuminates the laser light to a workpiece, wherein
the beam control mechanism includes at least
a condenser lens that receives the laser light and condenses the laser light at a predetermined magnification,
an optical path changing and holding mechanism that is disposed on an optical path of the laser light between the condenser lens and the incident end face of the optical fiber, and changes and holds the optical path of the laser light, and
a controller that controls an operation of the optical path changing and holding mechanism, and
the beam control mechanism controls the power distribution of the laser light emitted from the laser light emitting head by changing an incident position of the laser light on the incident end face of the optical fiber.

2. The laser processing device according to claim 1, wherein
the optical path changing and holding mechanism includes
a parallel plate-shaped optical member that transmits the laser light, and is provided to be tiltable about a first axis intersecting with an optical axis of the laser light, and
an actuator that is coupled to the optical member, and
the beam control mechanism changes the incident position of the laser light on the incident end face of the optical fiber by the controller that drives the actuator to tilt the optical member about the first axis.

3. The laser processing device according to claim 2, wherein the beam control mechanism causes the laser light to be incident on at least one of the core and the first cladding.

4. The laser processing device according to claim 1, wherein the beam control mechanism controls the power distribution of the laser light emitted from the laser light emitting head according to at least one of a material of the workpiece and a shape of a portion of the workpiece to be laser-processed.

5. The laser processing device according to claim 4, wherein the beam control mechanism is configured to switch between power distributions of the laser light emitted from the laser light emitting head during the laser processing of the workpiece.

6. The laser processing device according to claim 5, wherein the beam control mechanism is configured to periodically and continuously switch between the power distributions of the laser light emitted from the laser light emitting head during the laser processing of the workpiece.

7. A laser processing method using the laser processing device according to claim 1, the method comprising at least:
a first illumination step of illuminating the laser light having a first power distribution to the workpiece; and
a second illumination step of subsequently illuminating the laser light having a second power distribution different from the first power distribution to the workpiece.

8. The laser processing method according to claim 7, wherein
in the first illumination step, a molten pool and a keyhole are formed on a surface of the workpiece, and
in the second illumination step, an opening of the keyhole is expanded, and the molten pool is grown so as to have a desired weld-penetration depth.

9. The laser processing method according to claim 8, wherein in the second illumination step, the power distributions of the laser light are periodically and continuously switched at a predetermined frequency.

10. The laser processing method according to claim 9, wherein the predetermined frequency is substantially equal to a natural vibration frequency of a keyhole formed in the workpiece.

11. The laser processing method according to claim 7, wherein
in the first illumination step, a first portion of the workpiece having a first thickness is illuminated by the laser light, and
in the second illumination step, a second portion of the workpiece having a second thickness different from the first thickness is illuminated by the laser light.

\* \* \* \* \*